United States Patent [19]

Jones

[11] 4,212,091
[45] Jul. 15, 1980

[54] WIPER APPARATUS FOR A VIEWING SURFACE

[76] Inventor: Marcus C. Jones, 7009 Stonycreek Dr., Oklahoma City, Okla. 73132

[21] Appl. No.: 9,122

[22] Filed: Feb. 5, 1979

[51] Int. Cl.² ............................. B60S 1/12; B60S 1/44
[52] U.S. Cl. ............................... 15/250 B; 15/250.29
[58] Field of Search ............. 15/250.29, 250 B, 250.05

[56] References Cited

U.S. PATENT DOCUMENTS

| | | | |
|---|---|---|---|
| 1,338,002 | 4/1920 | Derry | 15/250.29 |
| 3,866,258 | 2/1975 | DeGraw | 15/250.29 |
| 4,037,287 | 7/1977 | Medearis et al. | 15/250.29 |

Primary Examiner—Robert L. Bleutge
Attorney, Agent, or Firm—Dunlap, Codding & McCarthy

[57] ABSTRACT

A remotely operable wiper apparatus for a viewing device comprising a mounting frame supporting a viewing device and further supporting a wiper frame slidingly disposed for bidirectional linear motion relative to a viewing surface of the viewing device. A wiper blade is supported by the wiper frame and is disposed to wipingly contact the viewing surface. Parallel first and second fluid cylinders supported by the mounting frame motivate the wiper frame in response to pressurized fluid selectively directed to the fluid cylinders.

21 Claims, 9 Drawing Figures

WIPER APPARATUS FOR A VIEWING SURFACE

FIELD OF THE INVENTION

The present invention relates generally to wipers for cleaning moisture accumulation on viewing surfaces, and more particularly, but not by way of limitation, to wipers for rear-vision mirrors externally mounted on motor vehicles.

DESCRIPTION OF THE PRIOR ART

During highway operation of a motor vehicle such as a truck under adverse weather conditions, rear-vision mirrors mounted on the sides of the vehicle may become covered with dirt, road oil or precipitation, thus disabling the operator of the vehicle from ascertaining the position of his vehicle with respect to other highway traffic. This problem, and the serious highway hazard it creates, is particularly severe when visibility is obstructed in the mirror mounted on the side of a vehicle opposite the driver's side, sometimes referred to as the "blind side". While the vehicle is in motion, the driver cannot reach the blind side mirror for manual cleaning or put his head outside a window on the blind side to check traffic conditions. Consequently, observation of traffic conditions on the blind side of the vehicle may be substantially impossible if the blind side mirror is obstructed. With respect to the driver's side mirror, although manual cleaning of the mirror and visual checking of traffic through a driver's side window are possible, both of these operations can be accomplished only by diverting attention from the operation of the vehicle, which may be unusually dangerous during inclement weather conditions. Consequently, repeated time-consuming stops may be required for maintaining the vehicle's rear vision mirrors in a clean condition. These stops not only cause costly delays in highway movement of freight and passengers, but may also present significant hazards in themselves to vehicles, personnel and cargo.

Known in the prior art is a motor-operated wiper which may be mounted on a rear-vision mirror for removal of precipitation. In such an apparatus, a wiper arm carrying a wiper blade is mounted on a rotating motor shaft. As the shaft turns in opposite directions, the wiper blade moves in an arc-shaped path across the mirror surface. Such an apparatus suffers from certain disadvantages during sub-freezing weather conditions, however. If the wiper blade or wiper arm becomes frozen by icing on the mirror or on the supporting frame, the motor may be burned out or be damaged when it is actuated by the vehicle operator. Consequently, repeated time-consuming checks of the wiper arm must be made to assure that the wiper arm is not immobilized when cleaning of the mirror is required. A further disadvantage of such an apparatus is the arc-shape cleaning path formed by the wiper blade. Because outside mirrors on trucks are generally of rectangular shape, portions of the mirror cannot be cleaned with such an apparatus, unless perhaps by an oversized wiper blade. However, an oversized blade of sufficient length to clean the full mirror would project beyond the mirror's edges and thus be subject to possible damage by the rapid airflow associated with a moving vehicle.

SUMMARY OF THE INVENTION

The apparatus of the present invention comprises a mounting frame which supports both a viewing surface and a wiper frame, with the wiper frame disposed for bidirectional linear movement alternately from a rest position to an extended position. A wiper blade is carried by the wiper frame to wipingly contact the viewing surface. The wiper frame is selectively motivated to respond in bidirectional linear motion with respect to the viewing surface via pressurized fluid feeding through conduits to a fluid cylinder disposed to move the wiper frame so that the wiper blade is moved parallel to the desired line of motion of the wiper frame. One conduit is connected to a first end of the fluid cylinder and another conduit is connected to a second end of the fluid cylinder. Control assemblies are interposed in the conduits to control flow of fluid from the source of pressurized fluid to the ends of the fluid cylinder.

It is an object of the present invention to provide an improved wiper apparatus for cleaning a viewing surface mounted externally on a movable vehicle.

Another object of the present invention, while achieving the above object, is to provide an improved wiper apparatus which is capable of being actuated by a remotely disposed control assembly.

Yet another object of the present invention is to provide an improved wiper apparatus which is capable of cleaning an entire rectangular surface.

One other object of the present invention, while achieving the above objects, is to provide an improved wiper apparatus which will not suffer component damage in the event of temporary immobilization of the apparatus due to frozen precipitation.

Other objects, features and advantages of the present invention will become evident from the following description of the preferred embodiment of the invention, when read in conjunction with the accompanying drawings and appended claims.

DESCRIPTION OF THE PREFERRED EMBODIMENT

Figure 1:
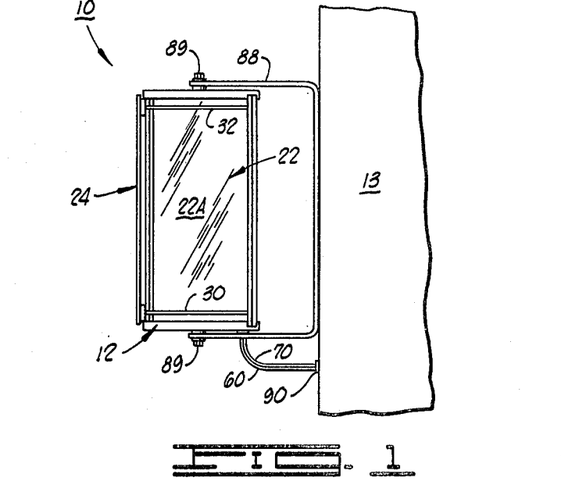
FIG. 1 is a front elevational view of a wiper apparatus constructed in accordance with the present invention as shown mounted on a support frame in viewing orientation.
Figure 2:
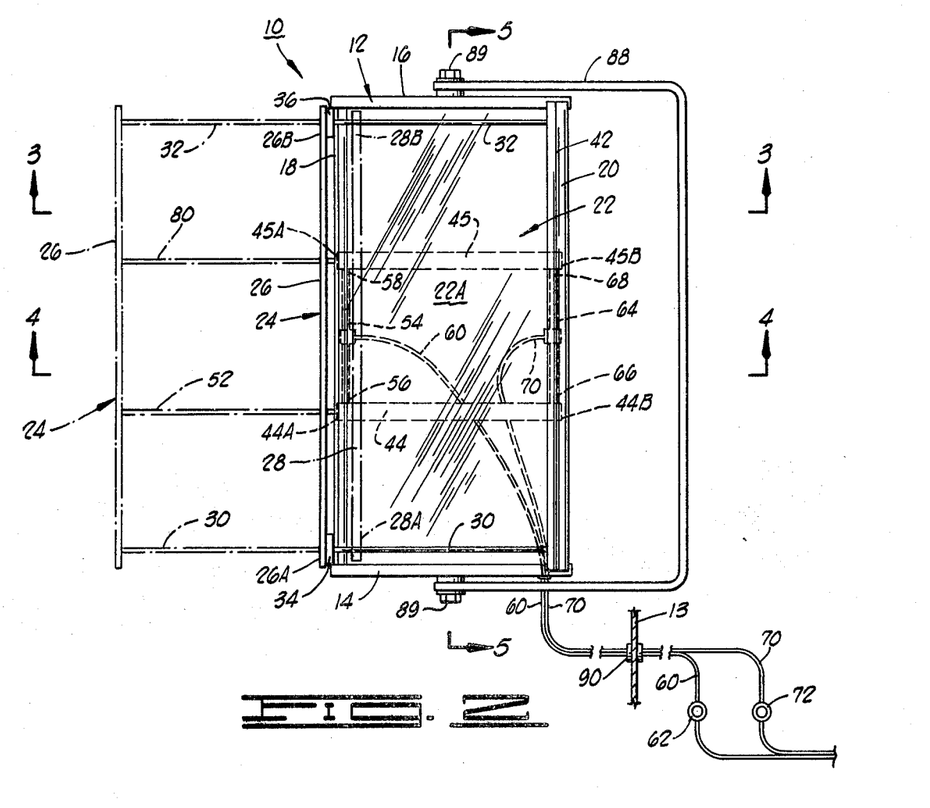
FIG. 2 is an enlarged, more detailed front elevational view of the wiper apparatus of FIG. 1, showing the internal components of the apparatus.

With reference to FIGS. 1 and 2, the improved wiper apparatus of the present invention, also sometimes referred to hereinbelow as a viewing surface cleaner, which is generally designated by the reference numeral 10, comprises a mounting frame 12 formed from a sturdy, weather-resistant material such as thin-gauged sheet metal. The mounting frame 12, shown mounted on a truck frame 13, has a first end 14, a second end 16, a first side 18 and a second side 20, all of which are interconnected to form the frame 12 into a generally rectangular shaped configuration. The mounting frame 12 supports the edges of a flat viewing device 22 having a viewing surface 22A, such as a mirror, preferably via grommet supports 23 in the manner shown in FIGS. 3 and 4.

Returning to FIGS. 1 and 2, a wiper frame 24 is supported by the mounting frame 12, with the wiper frame 24 featuring a transverse member 26 having a first end 26A and a second end 26B. The transverse member 26 is preferably formed from relatively thin strands of a strong, lightweight material such as steel wire, which may be bent into a closed loop having the C-shaped configuration characterizing the transverse member 26. If the viewing device 22 is to be used as a rear-vision mirror for a motor vehicle, the possibly damaging effects of rapid and turbulent air flow over the transverse member 26 will be minimized with such a closed loop design because of its relatively small surface area and its capability of flexing movement. The wiper frame 24 further comprises a rigid blade support member 28 which has a first end 28A and a second end 28B, as best shown in FIGS. 3 and 4.

The first end 26A of the transverse member 26 is connected to the first end 28A of the blade support member 28 by a rigid first extension member 30. In like manner, the second end 26B of the transverse member 26 is connected to the second end 28B of the blade support member 28 by a rigid second extension member 32. Both extension members 30 and 32 are preferably small diameter rods selected of such size to minimize obstruction of the viewing surface 22A. The extension members 30 and 32 are preferably secured to the transverse member 26 and the blade support member 28 via washers in conventional threaded connection with the extension members 30 and 32. If a closed loop of steel wire is used to form the transvese member 26, the extension members 30 and 32 may be secured between adjacent legs of the loop.

Figure 3:
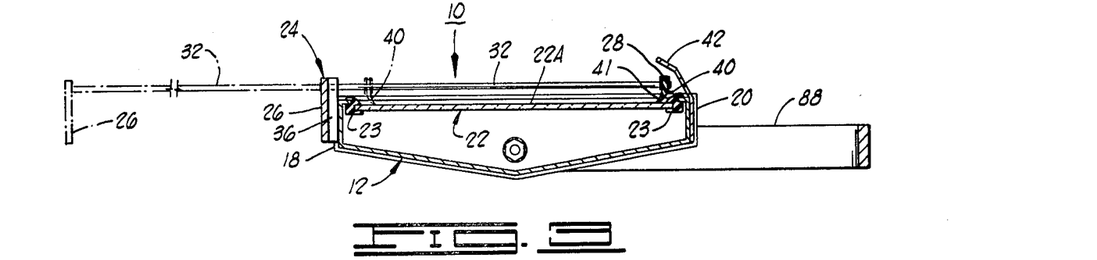
FIG. 3 is a cross-sectional view of the wiper apparatus of FIG. 2 taken along the line 3—3.
Figure 4:
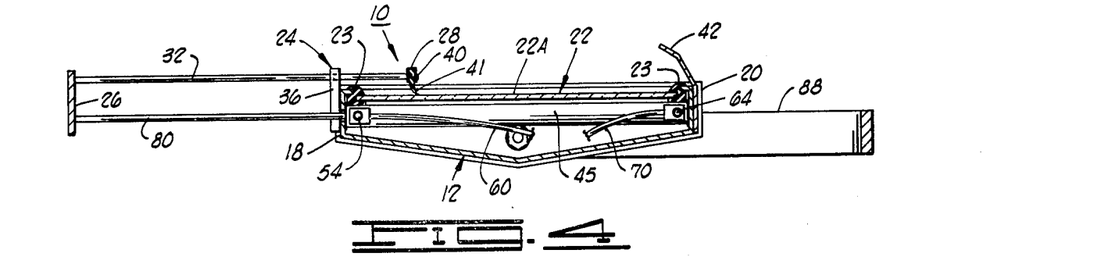
FIG. 4 is a cross-sectional view of the wiper apparatus of FIG. 2 taken along the line 4—4.
Figure 5:
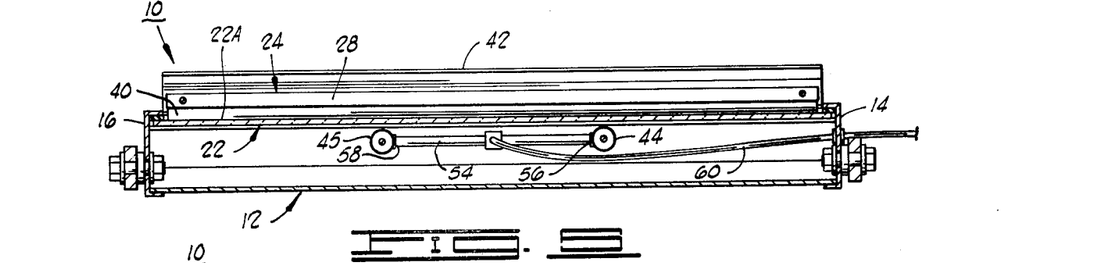
FIG. 5 is a cross-sectional view of the wiper apparatus of FIG. 2 taken along the line 5—5.
Figure 6:
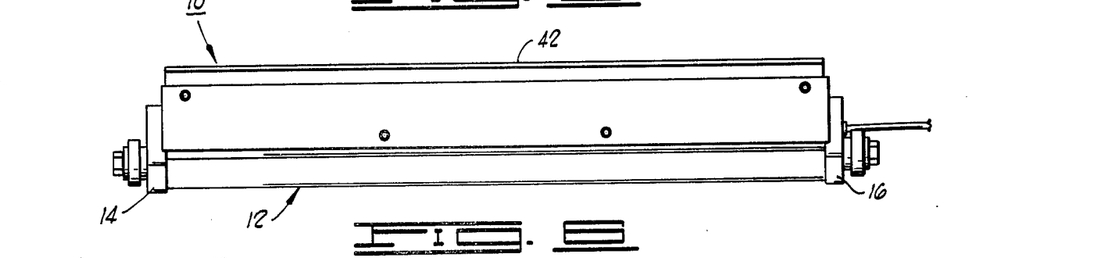
FIG. 6 is a side elevational view of the wiper apparatus of FIG. 2.
Figure 7:
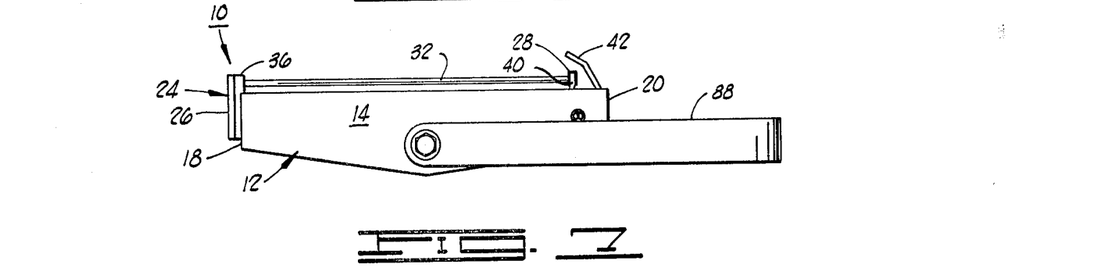
FIG. 7 is a top plan view of the wiper apparatus of FIG. 2.

FIGS. 3 and 4 are cross-sectional views of the wiping apparatus 10 taken respectively along the lines 3—3 and 4—4 shown in FIG. 2, and each of these views shows the box-like structural configuration of the mounting frame 12, which is preferably formed into the shape depicted from a single sheet of relatively thin-gauged metal. These views also show the manner in which the various components are supported by the mounting frame 12.

With reference to FIG. 4, the wiper frame 24 is supported by elevation means comprising a first guide block 34 and a second guide block 36 that are connected to the mounting frame 12. The first guide block 34 is attached to the first side 18 near the first end 14 of the mounting frame 12, and comprises a rigid block penetrated by a bore (not shown) through which the first extension member 30 passes. A slot (not shown) is formed in the first guide block 34 to permit attachment of the first guide block 34 to the mounting frame 12 via a conventional bolt which is not shown in the drawings. This slot and bolt arrangement permits the first guide block 34 to be raised or lowered with respect to the viewing surface 22A.

In like manner, the second guide block 36 is attached to the first side 18 of the mounting frame 12 adjacent to the second end 16. The second guide block 36 is identical in construction to the first guide block 34. It will be noted that the second guide block 36 has a bore (not shown) through which the second extension member 32 passes. Also, the second guide block 36 has a slot by which a bolt (not shown) attaches the second guide block 36 to the mounting frame 12. By raising or lowering the first and second guide blocks 34 and 36, the position of the wiper frame 24 will be raised or lowered with respect to the viewing surface 22A.

A wiper blade 40, formed from a resilient, weather-resistant material such as rubber, is supported longitudinally along the blade support member 28. The wiper blade 40 is generally wedge-shaped in its cross-section and has a thin wiping edge 41 that is positioned via the blade support member 28 to wipingly engage the viewing surface 22A. Conventional attachment means may be utilized to removably secure the wiper blade 40 to the blade support member 28.

As will become more clear below, the wiper frame 24 is movable from a rest position depicted in FIG. 3 by solid lines, to an extended position, depicted in FIG. 3 in dashed lines. In FIG. 4, the wiper frame 24 is depicted as being positioned in the extended position in solid lines. When the wiper frame 24 is in its rest position, the wiper blade 40 is in the position shown in FIG. 3 and is disposed beneath a blade shelter 42 which is supported by the second side 20 of the mounting frame 12. The blade shelter 42 forms a hood that protects the wiper blade 40 from adverse weather and wind conditions while the wiper blade 40 is positioned in the rest position, and the blade shelter 42 also functions to provide an attractive, streamlined appearance to the wiper apparatus 10.

Figure 8:
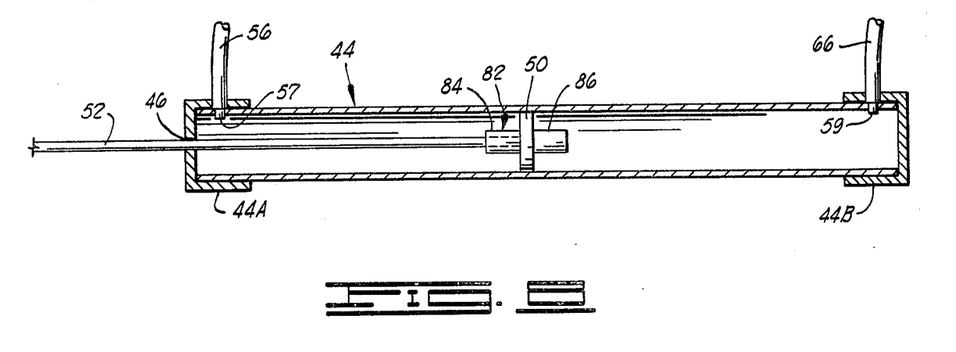
FIG. 8 is a cross-sectional view of the first fluid cylinder of the apparatus shown in FIG. 4.

As shown in dashed lines in FIG. 2, a first fluid cylinder 44 and a second fluid cylinder 45 are supported by the mounting frame 12 beneath the viewing device 22. The first fluid cylinder 4 has a first end 44A and a second end 44B, while the second fluid cylinder 45 has a first end 45A and a second end 45B. The fluid cylinders 44 and 45 are closed by cap members which are secured to the respective ends 44A, 44B, 45A and 45B of the cylinders. The cap members substantially seal the fluid cylinders except at a rod aperture 46 which is provided in the end 44A of the first fluid cylinder 44, and at another rod aperture (not shown) provided in the end 45A of the second fluid cylinder 45. As shown in FIG. 8, which is an enlargement of the first fluid cylinder 44, a circular first piston 50 is disposed in the interior of the first fluid cylinder 44 and is connected to one end of a rigid first piston rod 52. The first piston rod 52 extends through the rod aperture 46 in the cap member at the first end 44A of the first fluid cylinder 44 and is connected at its other end to the transverse member 26 of the wiper frame 24 via conventional attachment means.

Referring to FIGS. 2 and 4, the first and second fluid cylinders 44, 45 are connected to a source of pressurized fluid (not shown) via a first fluid communication network which establishes fluid communication between the interior of the first fluid cylinder 44 at its first end 44A and the source of pressurized fluid. If the viewing device 22 is used in conjunction with a motor vehicle such as a truck, the source of pressurized fluid may be the service air supply for the vehicle's horn, windshield wipers, and other air-operated accessories. The first fluid communication network comprises a first header 54, supported by the mounting frame 12 and having a first end 56 and a second end 58. As best seen in FIG. 8, the first end 56 of the first header 54 is connected to the interior of the first fluid cylinder 44 at its first end 44A via a communication port 57. Intermediate to its first and second ends 56 and 58, the first header 54 is connected to a first conduit 60 which extends from the first header 54 to the first leg of a conventional header or Y-connector (not shown). A conduit (not shown) extends from the second leg of the Y-connector to the source of pressurized fluid. Interposed in the first conduit 60 is a first control assembly 62 which comprises a valve interposed in the first conduit 60, preferably at or near its point of connection with the Y-connector. While the construction of the valve 62 is optional, it is preferably of the type that has a button control mechanism for selective opening and closing of the valve. If the viewing surface 22A is to be used as a rear-vision mirror for a motor vehicle, the valve control may conveniently be disposed on the vehicle dashboard where it may easily be reached by the operator of the vehicle when actuation of the wiper apparatus 10 is required.

A second fluid communication network is provided to effect fluid communication between the interior of the first fluid cylinder 44 adjacent to its second end 44B and the source of pressurized fluid. The second fluid communication network comprises a second header 64 supported by the mounting frame 12 and having a first end 66 and a second end 68. The first end 66 of the second header 64 is connected to the interior of the first fluid cylinder 44 via a communication port 59 located at the second end 44B. Intermediate to the first and second ends 66 and 68, the second header 64 is connected to a second conduit 70 which extends from the second header 64 to the third leg of the Y-connector mentioned above. Interposed in the second conduit 70 is a second control assembly 72 for the selective actuation and deactuation of the second control assembly 72. The second control assembly 72 preferably comprises a valve of identical construction to the first control assembly 62, and, as discussed above, the valve control for the second control assembly 72 may conveniently be disposed on a vehicle dashboard.

The second fluid cylinder 45, identical in construction to the first fluid cylinder 44, is supported on the mounting frame 12 in a position parallel to that of the first fluid cylinder 44. The second fluid cylinder 45 has within its interior a second piston (not shown) identical in construction to that described above for the first piston 50. A second piston rod 80 is connected at one end to the second piston of the second fluid cylinder 45 and is connected at its other end to the transverse member 26 of the wiper frame 24. The second piston rod 80 is spatially oriented so as to be substantially parallel to the first piston rod 52 of the first cylinder 44.

The previously described first fluid communication network effects fluid communication between the interior of the second fluid cylinder 45 and the source of pressurized fluid. That is, the first header 54 of the first fluid communication network is connected at its second end 58 to a communication port (not shown), identical in design to the communication port 57, connected to the interior of the second fluid cylinder 45 adjacent to its first end 45A. The previously described second fluid communication network effects fluid communication between the interior of the second fluid cylinder 45 and the source of pressurized fluid. That is, the second header 64 of the second fluid communication network is connected by its second end 68 to the second fluid cylinder 45 at a communication port (not shown), identical in design to the communication port 59, connected to the second end 45B. It will be clear that the described arrangement of the first and second fluid communication networks will effect simultaneous fluid communication to the first and second fluid cylinders 44 and 45 from the source of pressurized fluid, since the described fluid communication networks connect these cylinders for parallel fluid actuation.

Referring once again to FIG. 8, which is an enlarged cross sectional view of the first fluid cylinder 44, a first piston stop 82 is formed by attaching a cylindrically shaped first stop member 84 to one side of the first piston 50, and a cylindrically shaped second stop member 86 to the opposite side of the first piston 50. It is suggested that the first and second stop members 84 and 86 be formed from a stiff, sturdy material such as rigid plastic tubing. The length of the first stop member 84 is such that engagement of the first stop member 84 with the first end 44A prevents the first piston 50 from covering or crossing the communication port 57. Similarly, the length of the second stop member 86 is such that engagement of the second stop member 86 with the second end 44B prevents the first piston 50 from covering or crossing the communication port 59. A second piston stop (not shown), identical in design and construction to the first piston stop 82, is disposed within the second fluid cylinder 45 and functions in a manner identical to that described for the first piston stop 82, so that the second piston does not cover or cross communication ports connecting the second fluid cylinder 45 to the first and second headers.

Returning to FIGS. 1 and 2, and considering the viewing device 22 in use as a rear-vision mirror for a motor vehicle, a support bracket 88 may be attached to the vehicle frame 13 to support the mounting frame 12 in the required viewing orientation with respect to the driver's position within the vehicle. The support bracket 88 is generally of a C-shaped configuration having appropriately positioned apertures through which bolts 89 connect the ends of the bracket 88 to the ends 14, 16 of the mounting frame 12. The bracket 88 is attached by conventional means to the vehicle frame 13. The conduits 60 and 70 pass through an appropriately positioned aperture in the vehicle frame 13 where they are secured by an elastomeric grommet 90 which serves to maintain the required slack in that portion of the conduits 60 and 70 extending externally to the vehicle frame 13.

Figure 9:
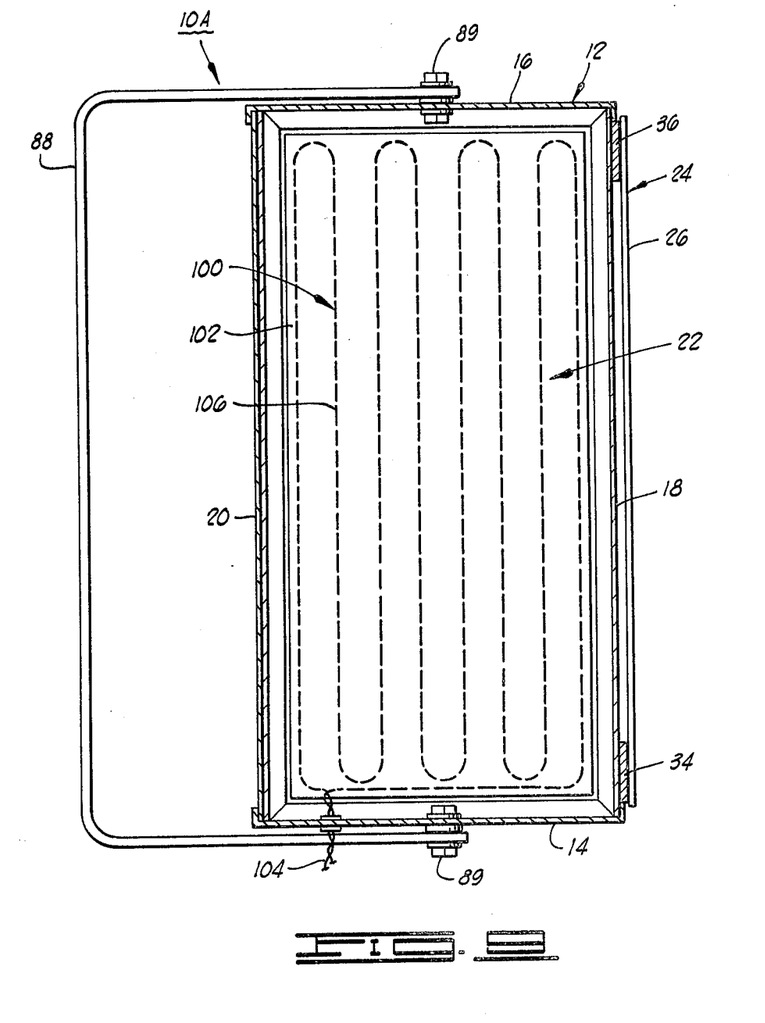
FIG. 9 is a back view of the apparatus shown in FIG. 2, with the rear of the mounting frame and internal components removed to show a defrosting unit.

To provide an all-weather rear-vision mirror for a motor vehicle, the wiper apparatus of the present invention may be modified to include a defrosting unit as shown in FIG. 9. FIG. 9 shows a rear elevational, cross-sectional view of a wiper apparatus 10A which in all respects is identical to the above described wiper apparatus 10 except for the modifications that will be described, and like numbers to that used to describe the wiper apparatus 10 will be used to denote the identical components of wiper apparatus 10A. In the interest of simplifying the drawing, the fluid cylinders 44 and 45, along with the associated components thereof have been omitted in order to show the back side of the viewing device 22. A defrosting uint 100 is attached to the back side of the viewing device 22 and comprises a flat sheet 102 of a heat-generating material such as Cellotherm, with appropriate electrical connections 104 that connect to the vehicle's electrical system. The sheet 102 has a high resistance wire 106 imbedded therein, shown in dashed line loop passes, and the sheet is adhered via adhesive bonding (not shown) directly to the non-viewing surface of the viewing device 22 between the device and the first and second fluid cylinders 44, 45. Conventional controls for regulating current flow in the sheet 102 may conveniently be disposed in the vehicle dashboard for selective defrosting as required. When energized, the defosting unit 100 will heat the viewing device 22 to melt any accumulation of frozen precipitation on the viewing surface 22A.

OPERATION

Prior to operation of the wiper apparatus 10, the wiper blade 40 is disposed in the rest position beneath the blade shelter 42 adjacent to the second side 20 of the mounting frame 12, a position which permits a substantially unobstructed view of the viewing surface 22A. In this configuration, the wiper frame 24 is disposed such that the extension members 30, 32 extend across the viewing surface 22A, but this presents no practical obstruction to the utilization of the viewing surface 22A. If such were to become objectionable for a particular application, the extension members 30, 32 could be relocated by appropriate design change.

When a cleaning movement over the viewing surface 22A is required, the second control assembly 72 is actuated to permit pressurized fluid to flow through the second conduit 70 to the second header 64 from there into the second ends of the first fluid cylinder 44 and the second fluid cylinder 45. For purposes of the discussion herein, the pressurized fluid will be assumed to be a gas such as air. The pressure of the gas against the first piston 50 and the second piston forces each piston to travel towards the first end of its respective fluid cylinder. The movement of the pistons effects movements of the first and second piston rods 52 and 80, which in turn causes the wiper frame 24 to travel above and across the viewing surface 22A from the second side 20 to the first side 18 of the mounting frame 12; that is, the wiper frame 24 is caused to assume the extended position. As the wiper frame 24 moves, the wiper blade 40 contacts the viewing surface 22A, thereby removing dirt and moisture along its path of travel. As may be seen in the figures, the straight line motion of the wiper frame 24 permits the wiper blade 40 to travel across and clean the entire viewing surface 22A, provided that the wiper blade 40 is substantially equal in length to the dimension of the viewing surface 22A transverse to the direction of blade movement.

The movement of the pistons, and thus the movement of the wiper blade 40, stops when the first and second piston stops contact the first ends of the respective fluid cylinders. At this point, the wiper frame 24 is in the position shown by the dashed lines shown in FIGS. 2 and 3. After the movement of the wiper frame 24 is halted, gas entering the first and second fluid cylinders 44 and 45 escapes into the surrounding environment. This gas escape or leakage can be effectuated by providing a small aperture (not shown) in the second ends 44B and 45B, or as commonly practiced, a loose fit of the cap members fitted on the ends 44B, 45B can be purposely established so as to permit slow gas bleeding therefrom.

For a second cleaning movement across the viewing surface 22A by the wiper blade 40, the second control assembly 72 is deactuated so as to halt the flow of gas through the second conduit 70, and the first control assembly 62 is actuated so as to cause the flow of gas from the source of pressurized fluid to the first conduit 60, and thus into the first header 54. Because the first and second piston stops prevent the first and second pistons from moving closer to the first ends of their respective fluid cylinders than the communication ports connected to the first header 54, the first and second pistons are disposed so that they will be moved to the second ends of their fluid cylinders by the gas flowing into and through the first header 54. The movement of the pistons, as discussed previously, causes the wiper blade 40 to be moved across the viewing surface 22A by the wiper frame 24. The movement of the wiper blade 40 is halted when the first and second piston stops strike the second ends of their respective fluid cylinders. Gas thereafter flowing into the fluid cylinders through the first conduit 60 will bleed into the external environment in the manner described above for the ends 44B, 45B. To augment this bleeding action, the rod apertures 46 may be slightly oversized to permit slow gas leakage from around the piston rods.

Upon termination of the second cleaning movement, the wiper blade 40 will be disposed beneath the blade shelter 42 in its rest position, ready for further cleaning motion. Because the piston stops prevent the pistons from moving closer to the second ends of their respective fluid cylinders than the communication ports connected to the second header 64, the first and second pistons are once again in position to be moved toward the first ends of their fluid cylinders by gas flowing into and through the second header 64 upon actuation of the second control assembly 72.

It will be noted that upon immobilization of the apparatus 10 by freezing of the wiper frame 24 or wiper blade 40 to the viewing surface 22A or to the mounting frame 12, as may occur under inclement weather conditions, the apparatus 10 will not be damaged by actuation of the first or second control assemblies for purposes of cleaning the viewing surface 22A. In such event, gas flowing into the fluid cylinders 44 and 45 will not move the first and second pistons because of the immobilization of the components connected to the pistons. Rather, the gas entering the fluid cylinders will harmlessly bleed into the external environment, thus avoiding possible equipment damage which would be threatened by immobilization of the components in prior art apparatus.

The preceding discussion has been premised on the use of gas as the power fluid for the fluid cylinders 44 and 45. However, it is to be understood that design modifications obvious to those skilled in the art would permit use of the apparatus 10 with a liquid power fluid as well. Most importantly, because bleeding of liquid from the fluid cylinders 44 and 45 would be inconvenient, costly and generally unfeasible, provision must be made for a fluid reservoir and pump for storage and recycling of fluid forced from the fluid cylinders 44 and 45 when either of the control assemblies 62 and 72 is actuated.

The present apparatus is subject to certain other modifications in construction and arrangement of various parts and elements of the preferred embodiment described herein. For example, the first and second control assemblies 62 and 72 may be replaced by a single automatic control assembly of conventional construction which when actuated causes fluid to flow into the first conduit 60 until the wiper blade 40 has completed a first cleaning movement, and then causes fluid to flow into the second conduit until the wiper blade 40 has completed a second cleaning movement. In order to augment the cleaning action of the wiper blade 40, an additional modification would involve the provision of a source of cleaning fluid to be applied by conventional pump apparatus to spray the cleaning fluid onto the viewing surface 22A.

It will be clear that the present invention is well adapted to carry out the objects and obtain the ends and advantages mentioned as well as those inherent therein. While a presently preferred embodiment of the invention has been described for purposes of this disclosure, numerous changes in addition to those discussed may be made which will readily suggest themselves to those skilled in the art and which are encompassed within the spirit of the invention disclosed and as defined in the appended claims.

What is claimed is:

1. In combination with a viewing device having a viewing surface, the viewing device projecting laterally from a vehicle, an improved wiping apparatus comprising:
   a mounting frame supporting the viewing device, the mounting frame and viewing device defining an enclosed interior cavity;
   a wiper frame slidingly supported on the mounting frame above the viewing surface;
   a wiper blade supported by the wiper frame and disposed to wipingly engage the viewing surface as the wiper frame is moved;
   a first fluid cylinder for motivating bidirectional linear movement of the wiper frame, the first fluid cylinder being supported by the mounting frame and disposed within the interior cavity in a position parallel to the line of travel of the wiper blade, the first fluid cylinder having a first end and a second end;
   a first piston disposed in the interior of the first fluid cylinder;
   a first piston rod extending through, and closely received in, an aperture in the mounting frame, the first piston rod having one end connected to the first piston and the other end connected to the wiper frame;
   first fluid communication means for establishing fluid communication to the first end of the first cylinder and comprising a first conduit;
   second fluid communication means for establishing fluid communication to the second end of the first cylinder and comprising a second conduit; and
   control means interposed in the first and second conduits for actuating fluid flow in a selectable one of the first and second conduits when the first and second conduits are connected to a source of pressurized fluid.

2. The apparatus of claim 1 in which the first fluid cylinder is further characterized as having first fluid pressure relief means for exhausting fluid from a selected one of the first and second ends in response to halting of movement of the first piston and in response to movement of the first piston toward the selected end.

3. The apparatus of claim 2 in which the first fluid pressure relief means is characterized as comprising:
   a first fluid release aperture adjacent the first end of the first fluid cylinder; and
   a second fluid release aperture adjacent the second end of the first fluid cylinder.

4. The apparatus of claim 3 wherein the first fluid cylinder further comprises:
   a first piston stop means for halting the first piston at a predetermined distance from the first end of the first fluid cylinder when actuated toward the extended position, the first fluid cylinder having a communication port connected to the first fluid communication means, said communication port disposed within said predetermined distance from the first end of the first fluid cylinder, said first piston stop means also halting the first piston at the predetermined distance from the second end of the first fluid cylinder when actuated toward the rest position, the first fluid cylinder having a communication port connected to the second fluid communication means, said communication port disposed within said predetermined distance from the second end of the first fluid cylinder.

5. The apparatus of claim 4 further comprising elevating means supported by the mounting frame for selectively varying the spatial disposition of the wiper frame relative to the viewing surface.

6. The apparatus of claim 5 in which the elevating means comprises at least one guide block supported by the mounting frame, with the guide block slidingly supporting the wiper frame so that the wiper frame is disposed in a selected spatial relationship to the viewing surface.

7. The apparatus of claim 6 in which the viewing surface is substantially flat and rectangularly shaped.

8. The apparatus of claim 7 in which the viewing surface is a mirror.

9. The apparatus of claim 4 further comprising:
   a second fluid cylinder supported by the mounting frame and disposed within the interior cavity in a position parallel to the line of travel of the wiper blade, the second fluid cylinder having a first end and a second end;
   a second piston disposed in the interior of the second fluid cylinder;
   a second piston rod extending through, and closely received in, an aperture in the mounting frame, the second piston rod having one end connected to the second piston and the other end connected to the wiper frame;
   the first communication means further characterized as establishing fluid communication to the first end of the second fluid cylinder; and
   the second communication means further characterized as establishing fluid communication to the second end of the second fluid cylinder.

10. The apparatus of claim 9 in which the second fluid cylinder is further characterized as having second fluid pressure relief means for exhausting fluid from a selected one of the first and second ends in response to halting of movement of the second piston and in response to movement of the second piston toward the selected end.

11. The apparatus of claim 10 in which the second fluid pressure relief means is characterized as comprising:
   a first fluid release aperture adjacent the first end of the second fluid cylinder; and
   a second fluid release aperture adjacent the second end of the second fluid cylinder.

12. The apparatus of claim 11 further comprising:
   a second piston stop means for halting the second piston at a predetermined distance from the first end of the second fluid cylinder when actuated toward the extended position, the second fluid cylinder having a communication port connected to the first communiction means, said communication port disposed within said predetermined distance from the first end of the second fluid cylinder, said second piston stop means also halting the second piston at the predetermined distance from the second end of the second fluid cylinder when actuated toward the rest position, the second fluid cylinder having a communication port connected to the second fluid communication means, said communication port to the second fluid communication means disposed within said predetermined distance from the second end of the second fluid cylinder.

13. The apparatus of claim 12 further comprising elevating means supported by the mounting frame for selectively varying the spatial disposition of the wiper frame relative to the viewing surface.

14. The apparatus of claim 13 in which the elevating means comprises at least one guide block supported by the mounting frame with the guide block slidingly supporting the wiper frame so that the wiper frame is disposed in a selected spatial relationship to the viewing surface.

15. The apparatus of claim 14 in which the viewing surface is substantially flat and rectangularly shaped.

16. The apparatus of claim 15 in which the viewing surface is a mirror.

17. The apparatus of claim 16 in which the first and second communication means further comprises:

a first header supported by the mounting frame and connected to provide fluid communication between the first end of the first fluid cylinder and the first end of the second fluid cyinder, the first conduit connected to provide fluid communication between the first header and the control means; and a second header supported by the mounting frame and connected to provide fluid communication between the second end of the first fluid cylinder and the second end of the second fluid cylinder, the second conduit connected to provide fluid communication between the second header and the control means.

18. The apparatus of claim 8 or 17 further comprising:
a support bracket supporting the mounting frame in a selected viewing orientation.

19. The apparatus of claim 8 or 17 further comprising:
defrosting means for heating the viewing device to melt accumulated frozen precipitation.

20. The apparatus of claim 1 further comprising elevating means supported by the mounting frame for selectively varying the spatial disposition of the wiper frame relative to the viewing surface.

21. The apparatus of claim 20 in which the elevating means comprises at least one guide block supported by the mounting frame, with the guide block slidingly supporting the wiper frame so that the wiper frame is disposed in a selected spatial relationship to the viewing surface.

* * * * *

UNITED STATES PATENT AND TRADEMARK OFFICE
CERTIFICATE OF CORRECTION

PATENT NO. : 4,212,091
DATED : July 15, 1980
INVENTOR(S) : Marcus C. Jones

It is certified that error appears in the above—identified patent and that said Letters Patent is hereby corrected as shown below:

Column 4, line 38, the numeral "4" should read -- 44 --.

Signed and Sealed this

Seventeenth Day of March 1981

[SEAL]

Attest:

RENE D. TEGTMEYER

Attesting Officer     Acting Commissioner of Patents and Trademarks